US008419254B2

(12) United States Patent
Liao et al.

(10) Patent No.: US 8,419,254 B2
(45) Date of Patent: Apr. 16, 2013

(54) FLAT TUBULAR LAMP

(75) Inventors: Chih-Ming Liao, Taoyuan (TW); Jih-Sheng Huang, Taoyuan County (TW); Chi-Fu Chuang, New Taipei (TW)

(73) Assignee: Enlight Corporation, Taoyuan (TW)

( * ) Notice: Subject to any disclaimer, the term of this patent is extended or adjusted under 35 U.S.C. 154(b) by 0 days.

(21) Appl. No.: 13/219,613

(22) Filed: Aug. 27, 2011

(65) Prior Publication Data
US 2012/0170259 A1 Jul. 5, 2012

(30) Foreign Application Priority Data
Dec. 31, 2010 (TW) .............................. 99225753 U

(51) Int. Cl.
*F21V 33/00* (2006.01)
(52) U.S. Cl.
USPC ............................ 362/610; 362/608; 362/612

(58) Field of Classification Search .................. 362/254, 362/612, 613, 608, 610, 628
See application file for complete search history.

(56) References Cited

U.S. PATENT DOCUMENTS

2002/0093810 A1\* 7/2002 Toyoda et al. .................. 362/31
2007/0274099 A1\* 11/2007 Tai et al. ........................ 362/610

\* cited by examiner

*Primary Examiner* — Laura Tso
(74) *Attorney, Agent, or Firm* — Li & Cai Intellectual Property (USA) Office

(57) ABSTRACT

A flat fluorescent lamp which includes: a long rectangular shaped light guiding panel, a light-emitting module, a light guiding body, a reflective layer, and at least one light-emitting diode. The light guiding body seamlessly connects between an end surface of the light guiding panel and the light-emitting module. The reflective layer is located exterior of the light guiding panel. A Coupling head is installed on the side of the light-emitting module that is away from the light guiding panel, and the coupling head is connected to the light-emitting module. Thereby, an energy efficient fluorescent lamp that can be thinner and installed on general lamp socket is provided.

13 Claims, 10 Drawing Sheets

FLAT TUBULAR LAMP

BACKGROUND OF THE INVENTION

1. Field of the Invention

The present invention relates to a flat tubular lamp; in particular, to a low profile flat tubular lamp having backward compatible coupling heads adaptable onto existing lamp seats.

2. Description of Related Art

Generally, because a traditional fluorescent lamp (such as conventional T8 or T9 type fluorescent lamps) lights up inductively, therefore there are common short-comings of energy wastage, low luminous efficiency, and environmental pollution, which does not fit with modern trend of energy conservation.

As show by FIG. 1, a prior art structure of fluorescent lamp, which includes lamp socket 1$a$ and fluorescent tube 2$a$, the lamp socket 1$a$ is installed on an indoor ceiling or hang freely below a ceiling; the fluorescent tube is of T8 or T9 specification, and using T8 as a 40 W fluorescent tube for example, the length is 1198 mm, the tube diameter is 26 mm, and its 2 ends are coupled with the lamp socket 1$a$, so that when fluorescent tube 2$a$ light up a reflective board (not shown) may reflect the light to increase luminous effect.

The aforementioned T8 or T9 fluorescent tube 1$a$ is currently the type of light tube used in a majority of family and offices, and is the traditional fluorescent light; however this type of fluorescent light uses a great amount of electricity and has a low luminous efficiency, which does not fit with modern requirement of environmental conservatism.

SUMMARY OF THE INVENTION

The object of the present invention is to provide a flat fluorescent lamp, set with coupling head, so as to enable installation on to a general lamp socket.

In order to achieve the aforementioned objects, according to an embodiment of the present invention, a flat fluorescent lamp is provided, which includes: a long rectangular shaped light guiding panel, which has a corresponding light-emitting surface and light-reflecting surface; a light-emitting module, which has a base plate and at least one light-emitting diode installed on the base plate; a light guiding body, seamlessly connected between an end surface of the light guiding panel and the light-emitting module; a reflective layer, located exterior of the light guiding panel; and a coupling head, installed on the side of the light-emitting module that is away from the light guiding panel, and the coupling head is connected to the light-emitting module.

According to an embodiment of the present invention, a flat fluorescent lamp is further provided, which includes: a long rectangular shaped light guiding panel, which has a corresponding light-emitting surface and light-reflecting surface; two light-emitting modules, which respectively has a base plate and at least one light-emitting diode installed on each of the base plates; two light guiding bodies, respectively and seamlessly connected between each end surfaces of the light guiding panel and the two light-emitting modules; a reflective layer, located exterior of the light guiding panel; and two coupling heads, respectively installed on each side of the two light-emitting modules that is away from the light guiding panel, and the coupling heads are respectively connected to the two light-emitting modules.

Per aforementioned, the flat fluorescent lamp provided by the embodiments of the present invention, has structure that can achieve the effect of becoming thinner, and can be connected to traditional lamp sockets through couple head, thereby achieve the effects of reduce energy consumption, possess long lasting and stable usage time span, and provides uniform and soft lighting.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

[The First Embodiment]

Figure 1:
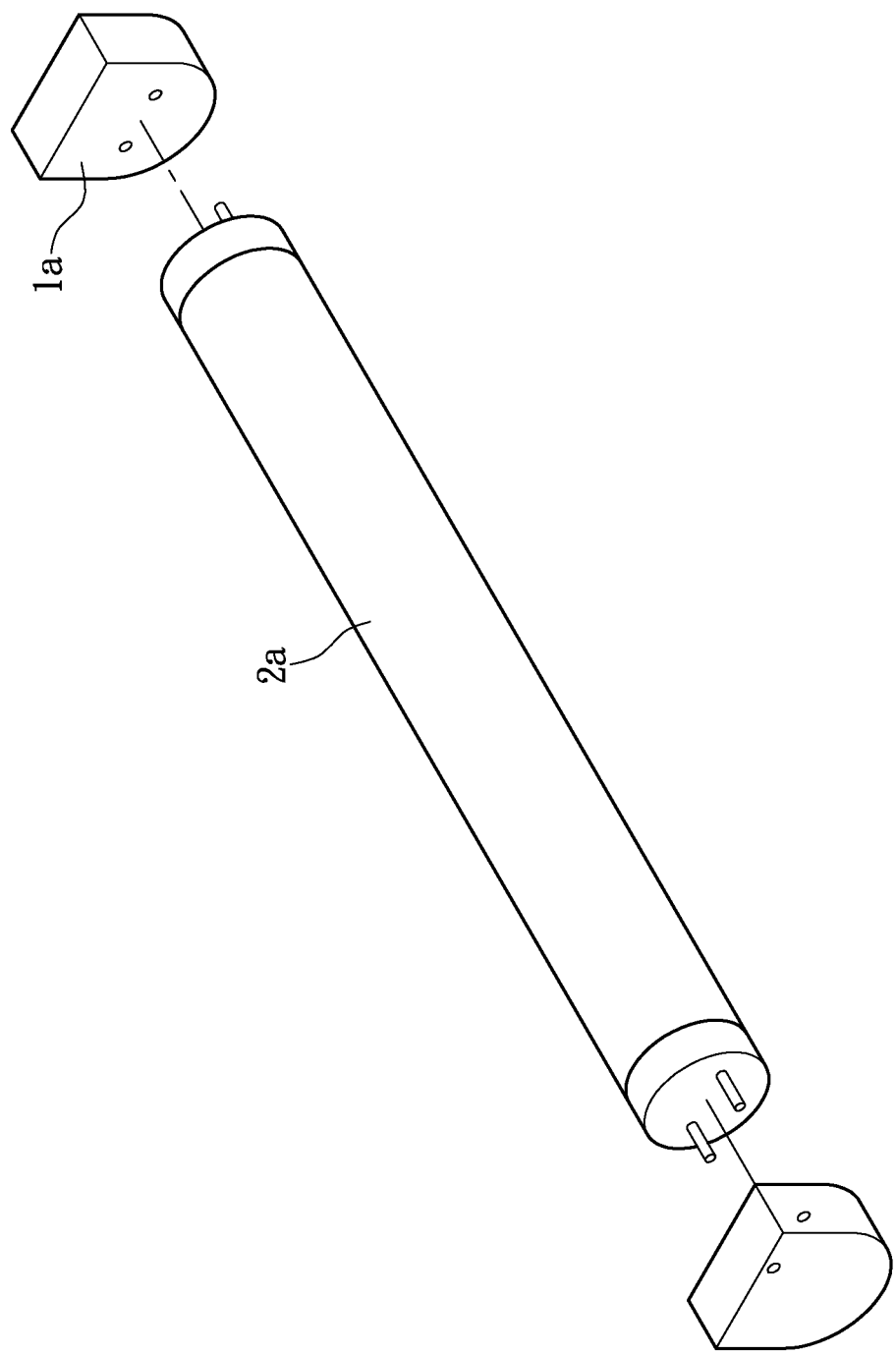
FIG. 1 shows a perspective diagram of a prior art fluorescent lamp.
Figure 2:
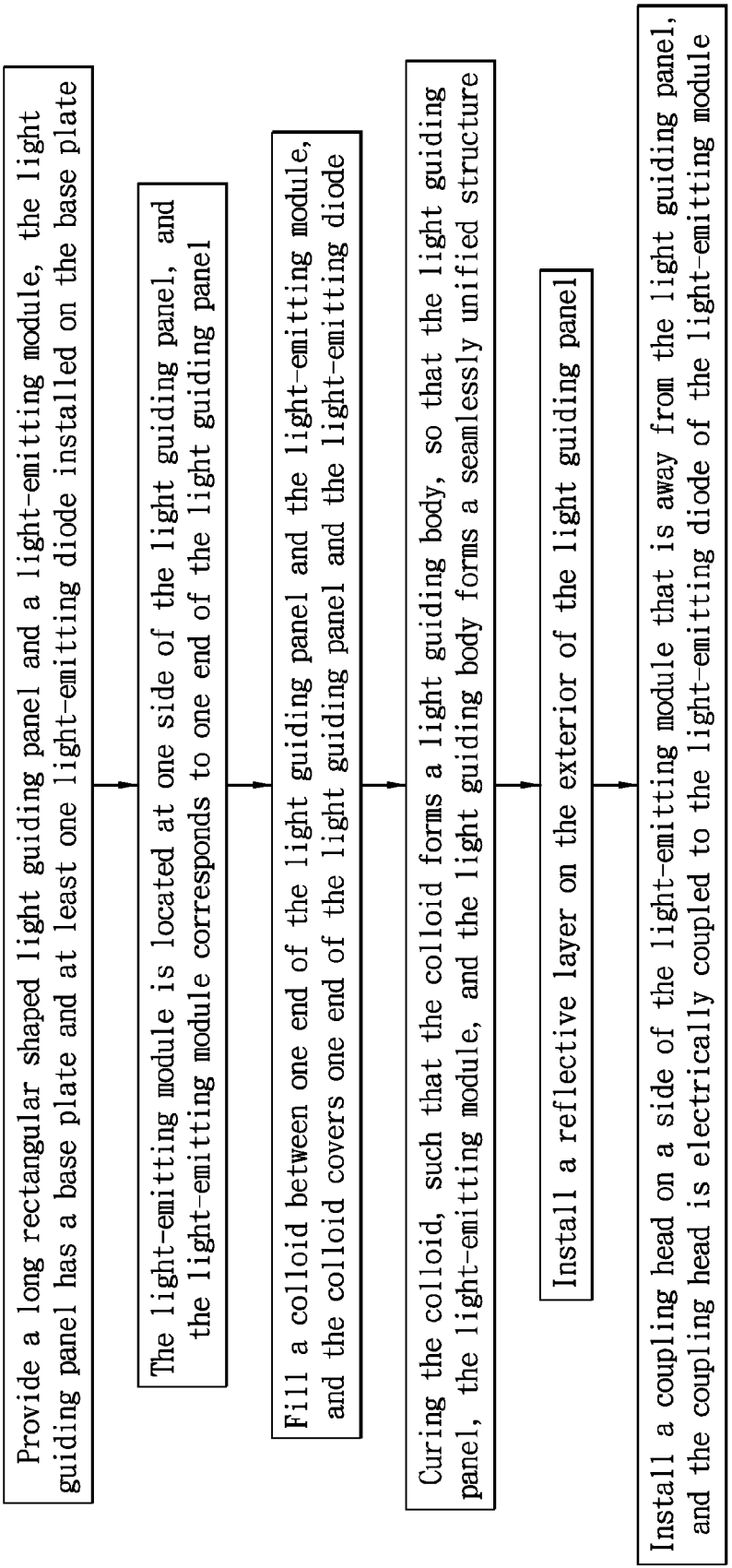
FIG. 2 shows a flow chart diagram according to a first embodiment of the present invention.

Reference FIGS. 2 to 7, which shows the first embodiment of the present invention; wherein FIG. 2 shows manufacturing method flow chart diagram of the present invention, FIGS. 3 to 7 shows perspective diagram of the present invention.

Figure 3:
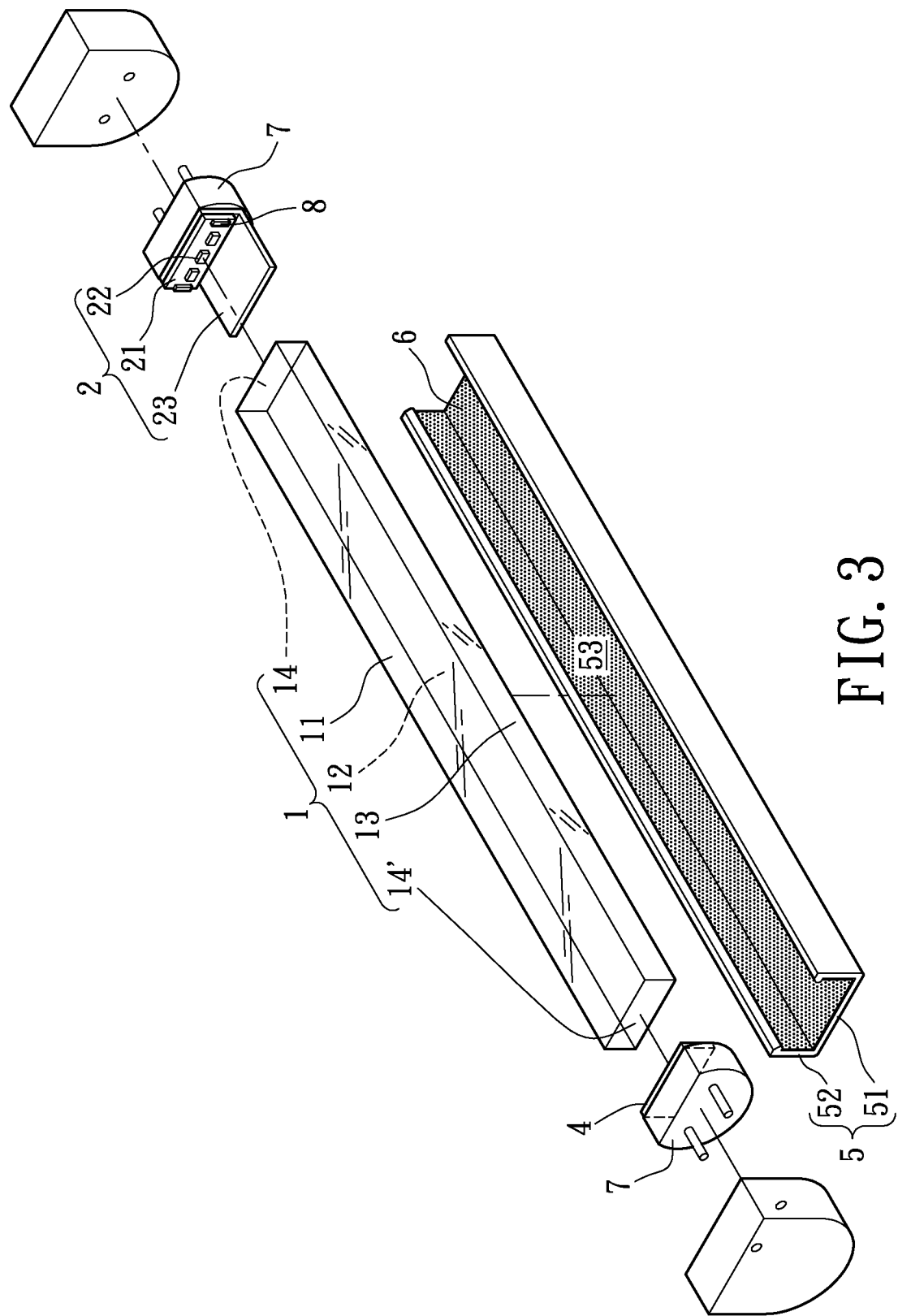
FIG. 3 shows an assembly diagram according to a first embodiment of the present invention that has not been filled with colloid.
Figure 5:
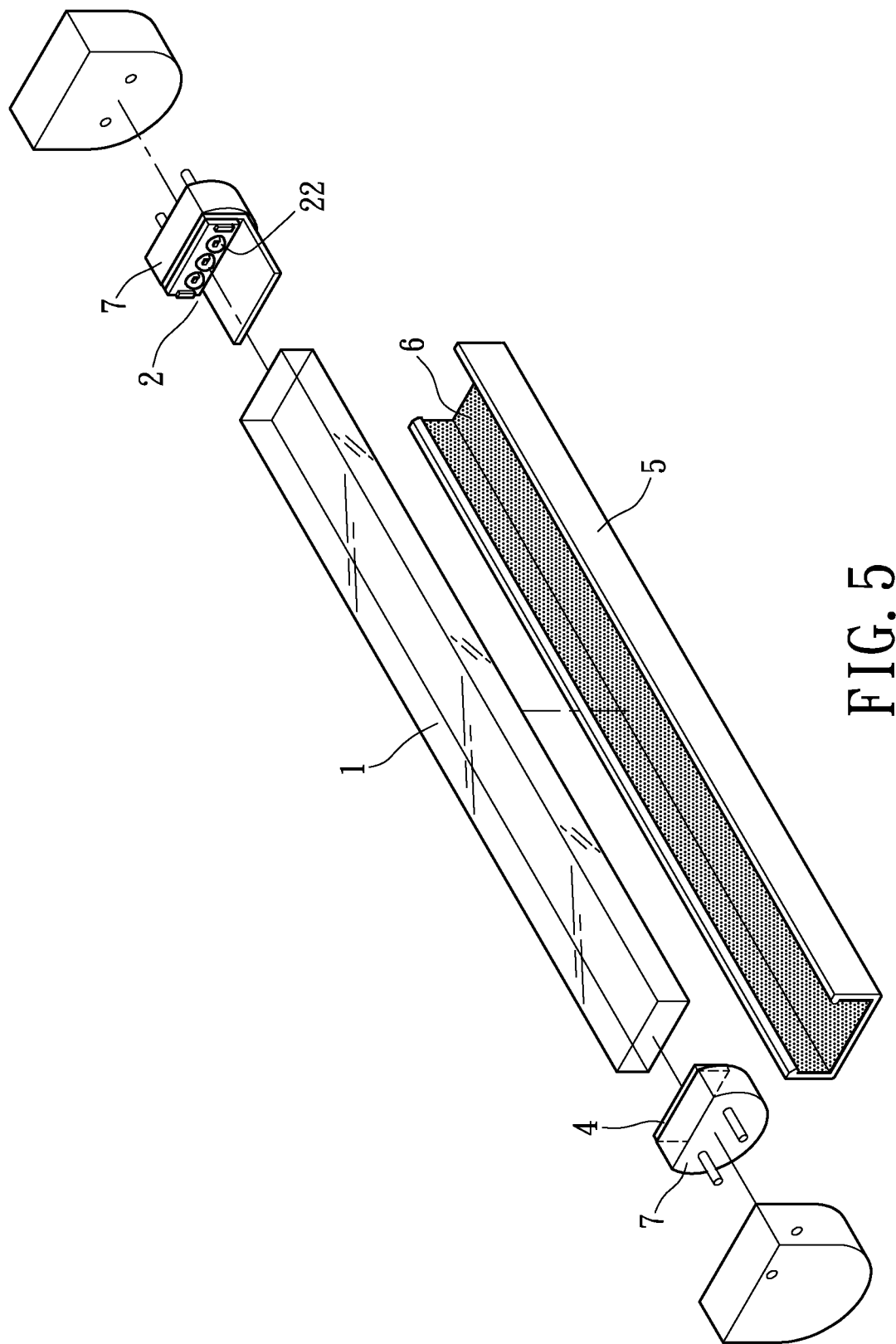
FIG. 5 shows a perspective diagram of a non-packaged light-emitting diode of the present invention.

Refer to FIG. 2 while cross referencing FIGS. 3 to 7, the present invention shows a flat fluorescent lamp manufacturing method, the steps include:

As show by FIG. 3, provide a long rectangular shaped light guiding panel 1 and a light-emitting module 2. The light guiding panel 1 has a corresponding light-emitting surface 11 and light-reflecting surface 12, and two long lateral surfaces 13 and two end surfaces 14, 14' that connects with the edge of the light-emitting surface 11 and light-reflecting surface 12. The light-emitting module 2 has a base plate 21 and at least one light-emitting diode 22 installed on the base plate 21; wherein the base plate 21 is an aluminum substrate with formed circuit, the light-emitting diode 22 can be packaged light-emitting diode 22 or non-packaged light-emitting diode 22 (as shown in FIG. 5). Furthermore, the light-emitting diode 22 of the present embodiment is singular in number as an example, but in actual application can be one or more.

Additionally, a heat dissipating sheet 23 can be installed on the side of the base plate 21 that is away from the light-emitting diode 22, so as to achieve better heat dissipation effect.

Figure 4:
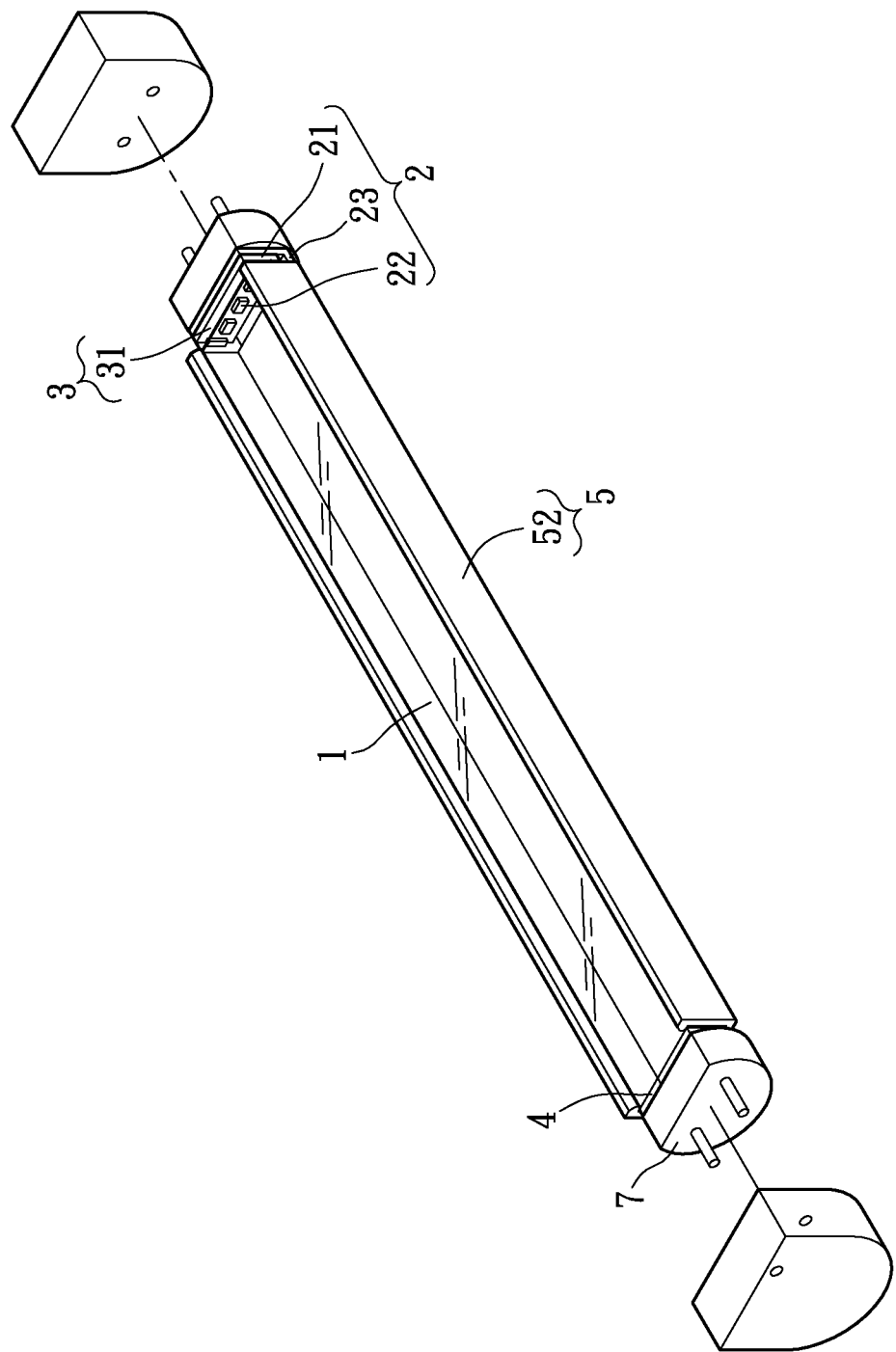
FIG. 4 shows a perspective diagram according to a first embodiment of the present invention.

As shown in FIGS. 3 and 4, colloid 3 (transparent/translucent adhesive) is applied on the light-emitting module 2 to substantially cover the light-emitting diode 22, and furthermore covers the flat surface of the base plate 21 that is installed with the light-emitting diode 22.

An end surface 14 of the light guiding panel 1 corresponds to the light-emitting diode 22, and the colloid 3 is installed thereon, such that it is seamless between the aforementioned end surface 14 of the light-guiding panel 1 and the light-emitting module 2; wherein the light guiding panel 1 and the light-emitting diode 22 can mutually abut or filled and connected with colloid 3.

As the colloid 3 is cured and forms a solid light guiding body 31 that is solidified, the light-emitting module 2, the light guiding panel 1, and the light guiding body 31 are seamlessly coupled as an unified structure. The colloid 3 can be a thermo-curing resin that solidifies by heat. Thus, while curing, heating is applied to the surroundings of colloid 3, so that heat is evenly disturbed, and thereby the colloid 3 is evenly solidified and forms the light guiding body 31. The colloid 3 can also be a resin colloid that solidifies by light (such as ultraviolet resin colloid), such that while curing, light of pre-determined wavelength (such as ultraviolet light) can be evenly cast on the colloid 3, and thereby the colloid 3 is evenly solidified and forms the light guiding body 31.

Also, if the light-emitting diode 22 is a non-packaged light-emitting diode 22 (as shown by FIG. 5), then after the aforementioned steps, the packaging effect is achieved, thereby, step of packaging the light-emitting diode 22 can be eliminated.

Additionally, the other end surface 14' of the light guiding panel 1 can be installed with an end panel 4; the end panel 4 is not installed with a light-emitting diode.

The light guiding panel 1 is installed with a base frame 5. The base frame 5 includes a main body 51, two fastening arms 52 respectively extending from the two long lateral sides of the main body 51, and a containing slot 53 formed between the main body 51 and the two fastening arms 52. Therein, the containing slot 53 of the base frame 5 is for installing the light guiding panel 1, and the two fastening arms 52 are coupled on the light-emitting surface 11 of the light guiding panel 1.

Figure 6:
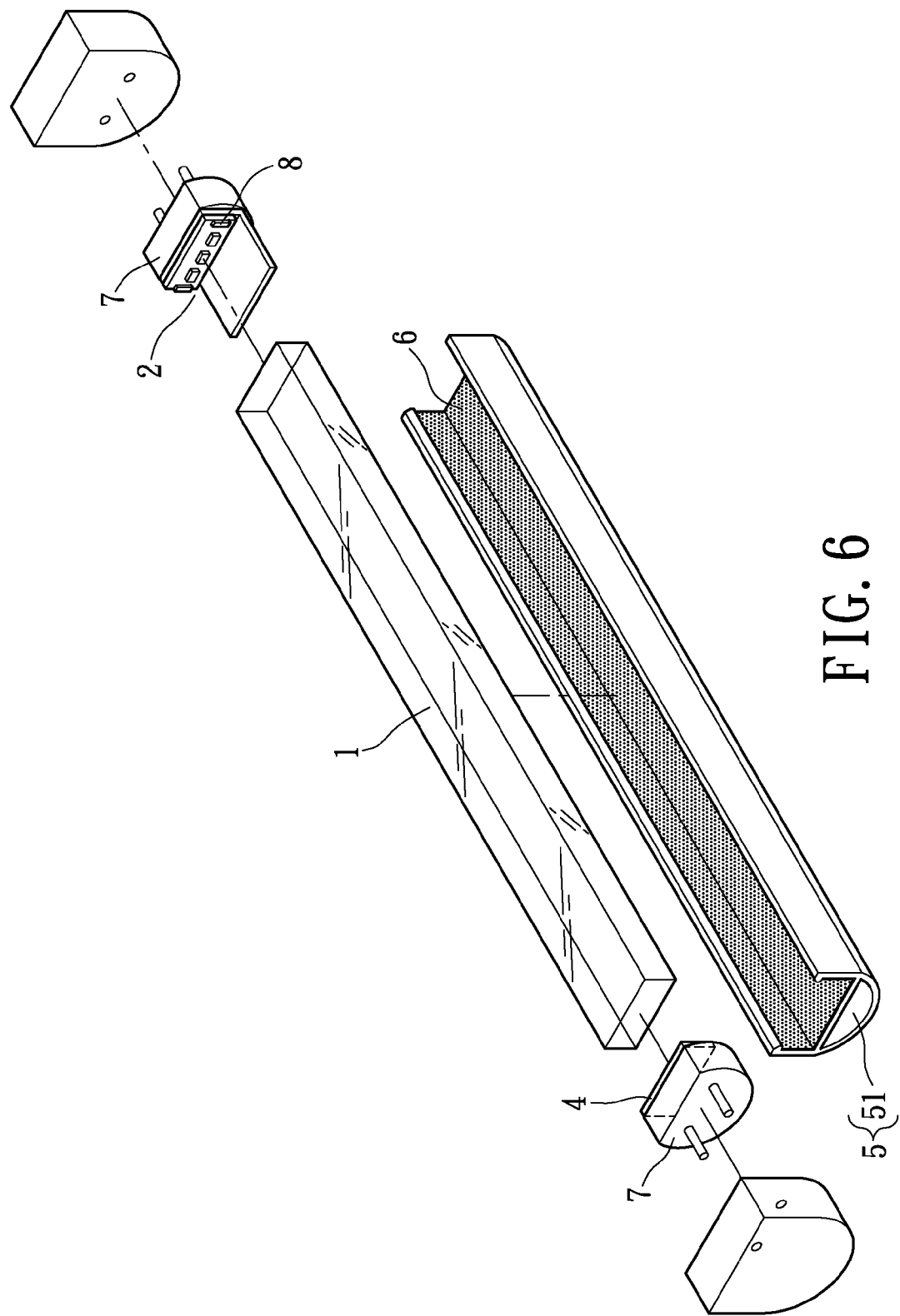
FIG. 6 shows an assembly diagram of a circular arc shaped bottom frame according to the present invention.
Figure 7:
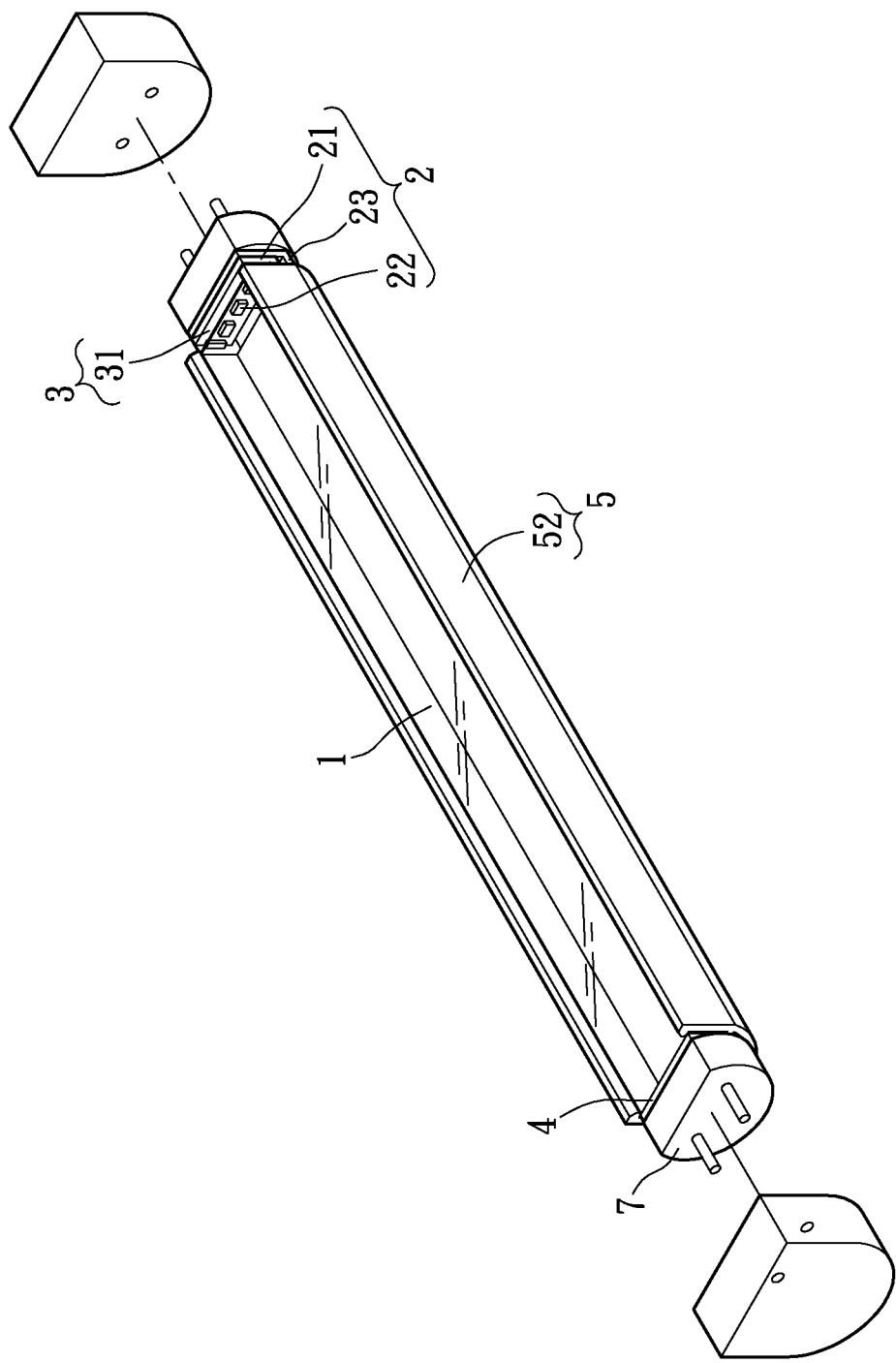
FIG. 7 shows a perspective diagram of a circular arced shaped bottom frame according to the present invention.

Also, the exterior side of the main body 51 of the base frame 5 that is away from the light guiding panel 1 can be hollow circular arc shaped (as shown in FIGS. 6 and 7), so that the needed components can be installed therein, such as a power supply (not shown) of the light-emitting module 2.

Additionally, the base frame 5 can be coupled with the heat dissipating sheet 23, so that heat can be transmitted to the base frame 5, thereby increasing the heat dissipation surface, so that better heat dissipation effect can be achieved.

A reflective layer 6 can be located on the exterior of the light guiding panel 1. Therein, the reflective layer 6 can be formed via coating on the reflective surface 12, the two long lateral surfaces 13, and the other end surface 14' (not shown); or the reflective layer 6 can be coated on the main body 51 of the base frame 5, the interior of the two fastening arms 52, and the flat surface of the end panel 4 that corresponds to the other end surface 14' of the light guiding panel 1. Furthermore, if the material of the base frame 5 is metallic, then the reflective layer 6 can also be formed by polishing on the main body 51 of the base frame 5 and the interior of the two fastening arms 52.

Also, the reflective layer 6 can also be a reflective sheet (not shown) with reflective effect, installed between the light guiding panel 1 and the base frame 5, and between the light guiding panel 1 and end panel 4.

The two coupling heads 7 can be installed on the side of the base plate 21 of the light-emitting module 2 that is away from the light guiding panel 1, and the light-emitting diode 22 is respectively electrically coupled to the neighboring coupling head 7.

Per the aforementioned steps, the flat fluorescent lamp manufactured, as shown in FIG. 4, has structure that can achieve the effect of becoming thinner, and the coupling head 7 can be installed on prior art lamp socket, thereby prior art fluorescent lamp can be replaced, energy consumption can be reduced, long lasting and stable life span can be achieved, and uniform and soft lighting can be provided. The following further introduces the flat fluorescent lamp of the present invention.

As shown by FIGS. 3 and 4, a flat fluorescent lamp includes a light guiding panel 1, a light-emitting module 2, a light guiding body 31, an end panel 4, a base frame 5, a reflective layer 6, and coupling heads 7. Therein, the light-emitting module 2 and the light guiding body 3 is formed on the exterior of the end surface 14 of the light guiding panel 1, the end panel 4 is installed on another end surface 14' of the light guiding panel 1, the base frame 5 is installed with the light guiding panel 1, the reflective layer 6 is installed between the base frame 5 and the light guiding panel 1, and the coupling heads 7 are respectively installed on the end of light emitting module 2 that is away from the light guiding panel 1 and on the end of end panel 4 that is away from the light guiding panel 1.

A light guiding body 31 is seamlessly connected between an end surface 14 of the light guiding panel 1 and the light-emitting module 2, such that the light guiding body 31, the light-emitting module 2, and the light guiding panel 1 is unified and seamlessly connected. Therein, the light guiding body 31 covers the light-emitting diode 22, and covers the flat surface of the base plate 21 that is installed with the light-emitting diode 22.

Additionally, light guiding panel 1 and the light guiding body 31 can be of the same material or different material. If the light guiding panel 1 and the light guiding body 31 is of the same material, then the light guiding body 31 is an extension of the light guiding panel 1, so that, at the intersection of the light guiding panel 1 and light guiding body 31 the loss of light is low. If the light guiding panel 1 and the light guiding body is of different material, then the reflection variance between the two can be within 0.05, for example the reflection rate for the light guiding panel 1 can be 1.49, then the reflection rate for the light guiding body 31 can be from 1.44 to 1.54.

Therefore, no matter the changes in temperature in the surrounding area of the flat fluorescent lamp, the flat fluorescent lamp shall expand or contract as a whole, thereby when the light-emitting diode 22 emits into the light guiding panel 1, rays of light can be maintained evenly in a set quantity, so as to increase the efficiency of light usage, and effectively prevent light-emitting diode 22 from being affected by external water vapor.

[The Second Embodiment]

Figure 8:
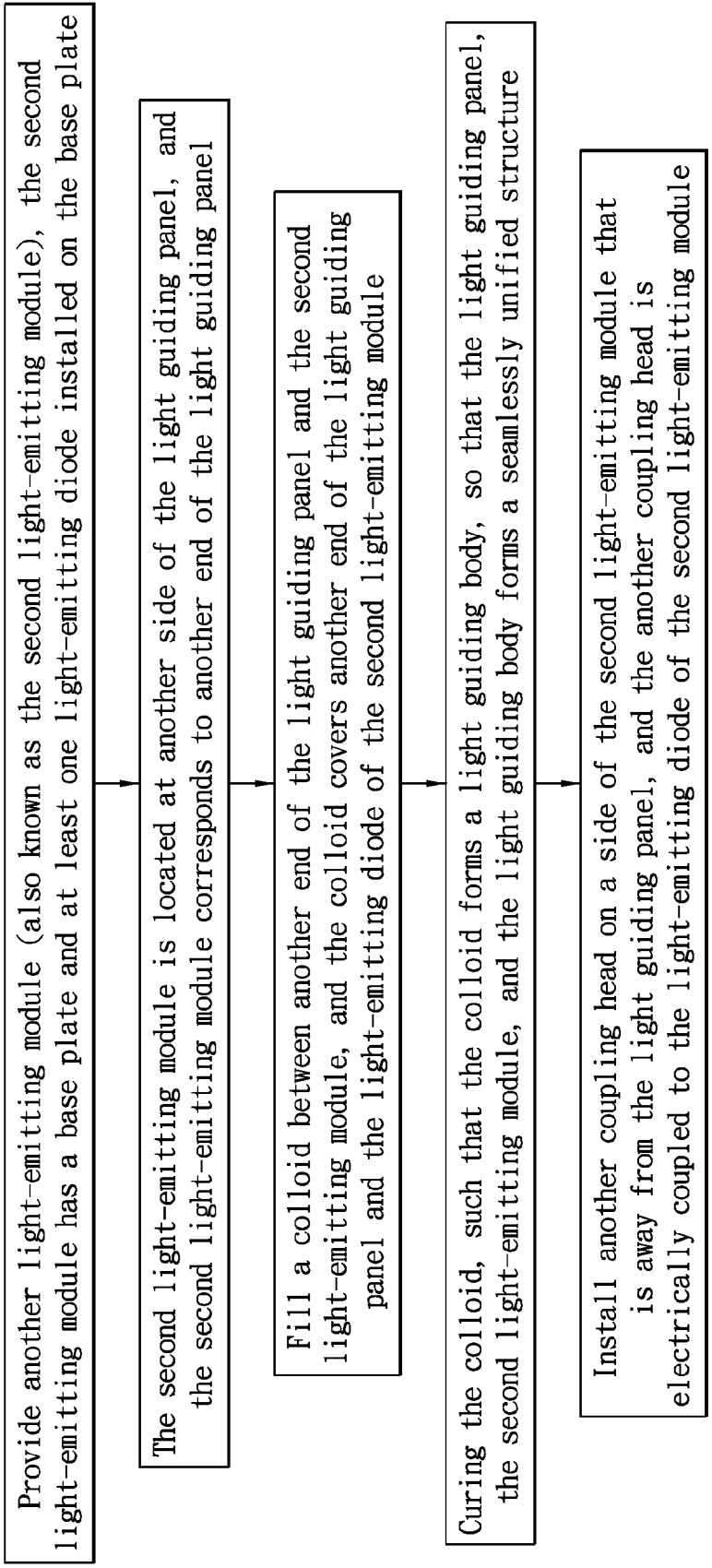
FIG. 8 shows a flow chart diagram according to a second embodiment of the present invention which differs from the first embodiment.
Figure 9:
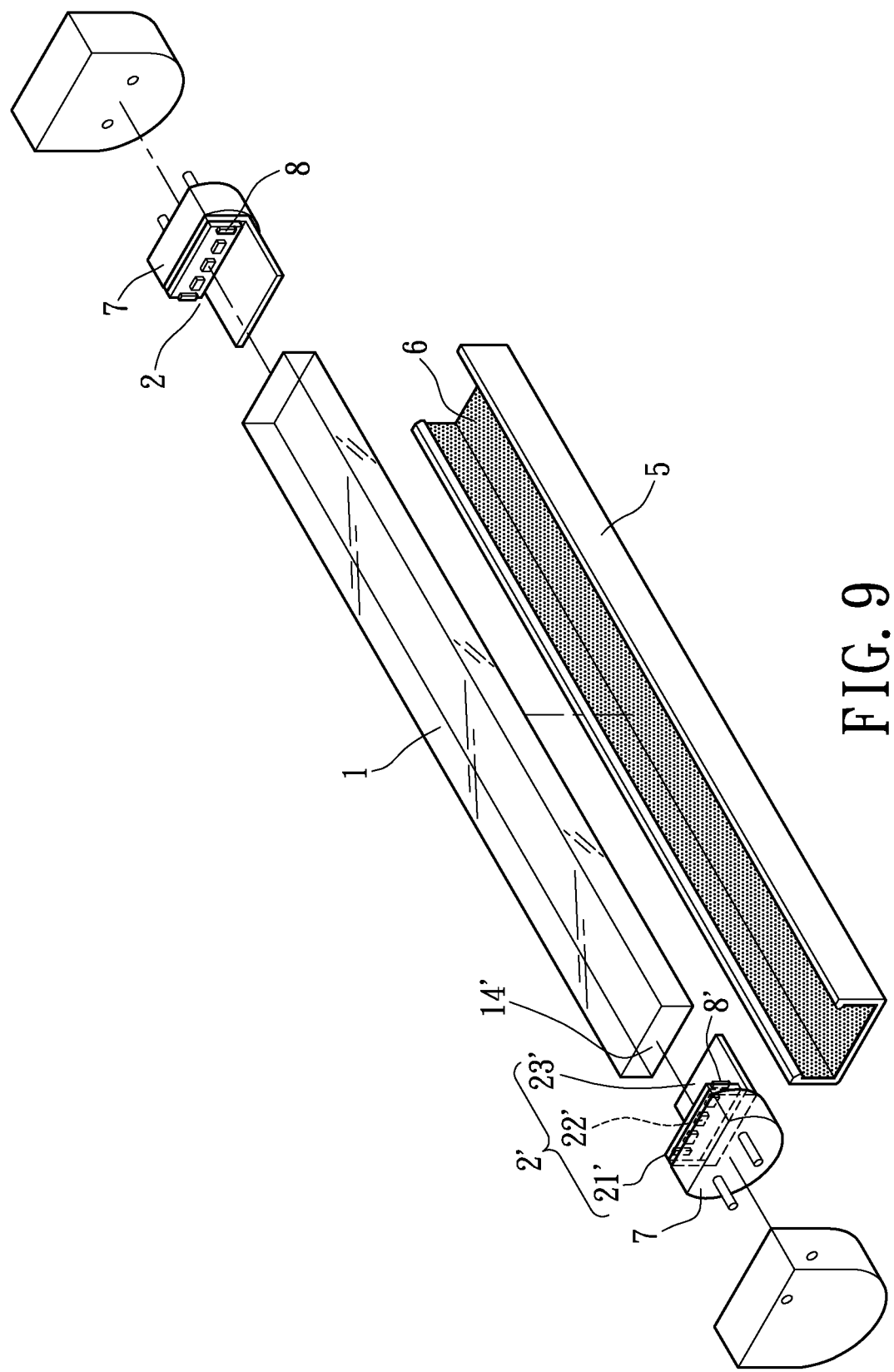
FIG. 9 shows an assembly diagram according to a second embodiment of the present invention that has not been filled with colloid.
Figure 10:
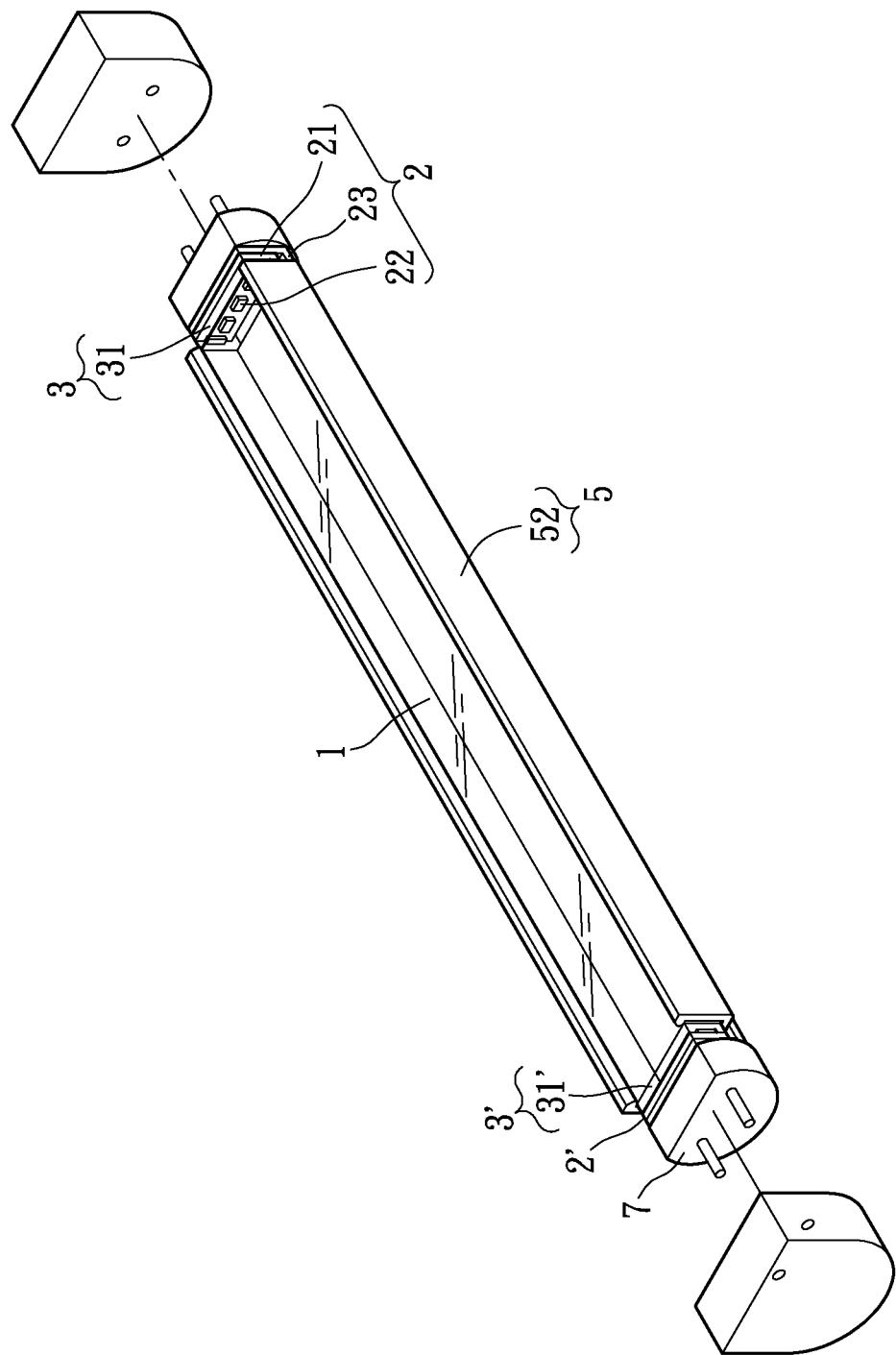
FIG. 10 shows a perspective diagram according to a second embodiment of the present invention.

Reference FIG. 8 to FIG. 10, which shows the second embodiment of the present invention; wherein FIG. 8 shows flow chart diagram of the present invention which differs from the first embodiment, FIGS. 9 and 10 shows perspective diagram of the present invention.

The present embodiment mainly connects another light-emitting module 2' (also known as the second light-emitting module 2') at another end surface 14' of the light guiding panel 1 of the first embodiment, thereby replacing the end panel 4, and the another surface 14' of the light guiding panel 1 does not install a reflective layer 6. The connecting steps for the light-emitting module 2' on another end surface 14' of the light guiding panel 1 is essentially the same as how the light-emitting module 2 connects with the end surface 14 of the light guiding panel 1 from the first embodiment.

Refer to FIG. 8 while cross referencing FIGS. 9 and 10, the difference in steps between the present embodiment and the first embodiment is described below:

Provide another light-emitting module 2'. The another light-emitting module 2' has a base plate 21' and at least one light-emitting diode 22' install on the base plate 21'; wherein the base plate 21' is an aluminum substrate with formed circuit, the light-emitting diode 22' can be packaged light-emitting diode 22' or non-packaged light-emitting diode 22'. Furthermore, the light-emitting diode 22' of the present embodiment is singular in number as an example, but in actual application can one or more.

Additionally, a heat dissipating sheet 23' can be installed on the side of the base plate 21' that is away from the light-emitting diode 22', so as to achieve better heat dissipation effect.

Colloid 3' can be coated on the another light-emitting module 2', the colloid 3' covers the aforementioned light-emitting diode 22', and furthermore covers the flat surface of the base plate 21' that is installed with the light-emitting diode 22'.

Another end surface 14' of the light guiding panel 1 corresponds to the aforementioned light-emitting diode 22' and the colloid is installed thereon, such that it is seamless between the aforementioned end surface 14' of the light guiding panel 1 and the light-emitting module 2'; wherein the light guiding panel 1 and the light-emitting diode 22' can mutually abut or filled and connected with colloid 3'.

Colloid 3' can be cured, so that colloid 3' forms light guiding body 31' that is solidified, such that the light-emitting module 2', the light guiding panel 1, and the light guiding body 31' forms a seamlessly unified structure.

The reflective layer 6 can be located on the exterior of the light guiding panel 1. Therein, the reflective layer 6 can be formed via coating on the reflective surface 12 and the two long lateral surfaces 13; or the reflective layer 6 can be coated on the main body 51 of the base frame 5 and the interior of the two fastening arms 52. Furthermore, if the material of the base frame 5 is metallic, then the reflective layer 6 can also be formed by polishing on the main body 51 of the base frame 5 and the interior of the two fastening arms 52.

Also, the reflective layer 6 can also be a reflective sheet (not shown) with reflective effect, installed between the light guiding panel 1 and the base frame 5.

The two coupling heads 7 can be respectively installed on each side of the light-emitting modules 2, 2' that is away from the light guiding panel 1, and the coupling heads 7 are respectively electrically coupled to the light-emitting diodes 22, 22' of the light-emitting modules 2, 2'.

Per the aforementioned steps, the flat fluorescent lamp manufactured, as shown in FIG. 10, has structure that can achieve the effect of becoming thinner, and the coupling head 7 can be installed on prior art lamp socket, thereby providing more adequate lighting.

[The Third Embodiment]

Reference FIGS. 3 and 9, which shows the third embodiment of the present invention; the present embodiment differs from the first and second, in the present embodiment, between the end surface 14 of the light guiding panel 1 and the base plate 21 of the light-emitting module 2 is installed with at least one stops 8, so as to prevent compression between the end surface 14 of the light guiding panel 1 and the base plate 21 of the light-emitting module 2, which could may damage light-emitting diode 22. Additionally, at least one stops 8 can be installed between the another end surface 14' of the light guiding panel 1 and the base plate 21' of the light-emitting module 2'.

Furthermore, for the present embodiment, the stops 8, 8' on the two ends of the light guiding panel 1 is numbered in two, but in actual application the number of stops is not limited thereby.

[The Effects of the Embodiments]

According to the embodiments of the present invention, the aforementioned structure of the flat fluorescent lamp can achieve the effect of becoming thinner, and the coupling head 7 can be installed on prior art lamp socket, thereby prior art fluorescent can be replaced, energy consumption reduced, long lasting and stable usage life span achieved, and uniform and soft lighting provided.

Also, when surrounding temperature changes, the flat fluorescent lamp expands and contracts as a whole. Thereby when light-emitting diode 22, 22' emits light into light guiding panel 1, rays of light can be maintained evenly in a set quantity, so as to increase the efficiency of light usage for light guiding panel 1, and effectively prevent light-emitting diodes 22, 22' from being affected by external water vapor.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A flat tubular lamp, comprising:
   a long rectangular shaped light guiding panel having a correspondingly opposing light-emitting surface and light-reflecting surface;
   a light-emitting module having a base plate and at least one light-emitting diode arranged on the base plate;
   a light guiding body seamlessly coupling an end surface of the light guiding panel and the light-emitting module;
   a reflective layer, located exterior of the light guiding panel; and
   a coupling head, installed on the side of the light-emitting module that is away from the light guiding panel, and the coupling head is connected to the light-emitting module,
   wherein the other end surface of the light guiding panel is installed with an end panel, and on the side of the end panel that is away from the light guiding panel is installed with another coupling head.

2. The flat tubular lamp according to claim 1, wherein the at least one light-emitting diode is a non-packaged light-emitting diode or a packaged light-emitting diode.

3. The flat tubular lamp according to claim 1, wherein the flat fluorescent lamp further comprise a base frame, the interior of the base frame corresponds to the exterior of the light guiding panel, and the reflective layer is installed between the light guiding panel, the base frame, and the end panel.

4. The flat tubular lamp according to claim 3, wherein the reflective layer is coated on the light guiding panel, or the reflective layer is coated on the base frame and the end panel.

5. The flat tubular lamp according to claim 3, wherein the base frame include a main body, two fastening arms extending from the main body, and a containing slot formed between the main body and the two fastening arms, so that the light guiding panel is installed within the containing slot of the base frame, and the two fastening arms are coupled on the light-emitting surface of the light guiding panel.

6. The flat tubular lamp according to claim 5, wherein the exterior side of the base frame that is away from the light guiding panel is flat shaped or hollow circular arc shaped.

7. The flat tubular lamp according to claim 6, wherein at least one stops is installed between the light guiding panel and the light-emitting module.

8. A flat tubular lamp, comprising:
- a long rectangular shaped light guiding panel having a correspondingly opposing light-emitting surface and light-reflecting surface;
- two light-emitting modules, each having a base plate and at least one light-emitting diode arranged on each of the base plates;
- two light guiding bodies, respectively and seamlessly coupling end surfaces of the light guiding panel and the two light-emitting modules;
- a reflective layer, located exterior of the light guiding panel; and
- two coupling heads, respectively installed on each side of the two light-emitting modules that is away from the light guiding panel, and the coupling heads are respectively connected to the two light-emitting modules; and
- a base frame, the interior of the base frame corresponds to the exterior of the light guiding panel, and the reflective layer is installed between the light guiding panel and the base frame.

9. The flat tubular lamp according to claim 8, wherein the at least one light-emitting diode is a non-packaged light-emitting diode or a packaged light-emitting diode.

10. The flat tubular lamp according to claim 8, wherein the reflective layer is coated on the light guiding panel, or the reflective layer is coated on the base frame.

11. The flat tubular lamp according to claim 9, wherein the base frame include a main body, two fastening arms extending from the main body, and a containing slot formed between the main body and the two fastening arms, so that the light guiding panel is installed within the containing slot of the base frame, and the two fastening arms are coupled on the light-emitting surface of the light guiding panel.

12. The flat tubular lamp according to claim 11, wherein the exterior side of the base frame that is away from the light guiding panel is flat shaped or hollow circular arc shaped.

13. The flat tubular lamp according to claim 12, wherein at least one stops is respectively installed between the light guiding panel and each of the two light-emitting modules.

\* \* \* \* \*